United States Patent [19]

Demartini

[11] Patent Number: 5,365,663
[45] Date of Patent: Nov. 22, 1994

[54] METHOD OF ATTACHING A MONITOR TARGET TO A SHROUDED BLADE

[75] Inventor: John F. Demartini, Lake Mary, Fla.

[73] Assignee: Westinghouse Electric Corporation, Pittsburgh, Pa.

[21] Appl. No.: 874,949

[22] Filed: Apr. 28, 1992

[51] Int. Cl.⁵ .............................................. B23P 15/00
[52] U.S. Cl. ................................. 29/889.21; 29/889.2
[58] Field of Search ............... 29/889, 889.2, 428, 29/889.21; 73/119 R, 660, 661; 324/207.22, 164

[56] References Cited

U.S. PATENT DOCUMENTS

| 3,115,032 | 12/1963 | Northern et al. ............... 73/71.4 |
| 4,518,917 | 5/1985 | Oates et al. ..................... 324/207 |
| 4,574,237 | 3/1986 | Hachtel et al. .................. 324/173 |
| 4,734,009 | 3/1988 | Campbell et al. ............... 29/889.2 |
| 5,156,529 | 10/1992 | Ferleger et al. ................. 29/889.2 |

Primary Examiner—Irene Cuda
Attorney, Agent, or Firm—G. R. Jarosik

[57] ABSTRACT

Method of attaching a target for use in a system for monitoring the vibration of a plurality of shrouded turbine blades to a shroud segment. The target includes a shim plated with a highly conductive material for inducing variations in eddy currents generated by stationary sensors, as part of a system for monitoring blade vibrations. The target is spot welded to the shroud segment of the turbine blades at the turbine site using portable welding equipment, providing effective and low cost installation.

11 Claims, 1 Drawing Sheet

METHOD OF ATTACHING A MONITOR TARGET TO A SHROUDED BLADE

This invention relates generally to apparatus, systems and methods for monitoring the vibrations of shrouded turbine blades. More particularly, this invention relates to targets to be used in cooperation with sensors and blade vibration monitors for monitoring turbine blade vibration.

BACKGROUND OF THE INVENTION

In order to provide for efficient operation of steam turbines and to prevent blade fracturing, systems are known for determining the vibrations of shrouded turbine blades. These systems generate data associated with the position of the turbine blades at a specified time, as well as blade revolution data. This data is received by a monitor and blade vibration information may be extracted therefrom. Turbine blade vibration information is used for various purposes, including early detection of blade stresses which may cause the blade to fracture at some time in the future.

As described in U.S. Pat. No. 5,097,771, titled Shrouded Turbine Blade Vibration Monitor and Target Therefor, assigned to the assignee of the present invention, blade vibration monitoring systems generally comprise a stationary sensor located within a seal around the shrouded turbine blades. The sensor induces eddy currents in the shroud segment of the turbine blades as each shroud segment passes the sensor. A target is located on each shroud segment for causing a variation in the induced eddy currents. The sensor is responsive to the variation in the induced eddy currents to produce an output signal containing information corresponding to the time of arrival of the target at the sensor. Another sensor is responsive to indicia carried by the turbine rotor for producing a once per revolution pulse. A blade vibration monitor is responsive to the output signal and the once per rotor revolution pulse, and blade vibration information may be determined from this data.

Various forms of targets are known for providing the variations in the eddy currents induced by the stationary sensor used in a blade vibration monitoring system, as described in U.S. Pat. No. 5,097,711. These targets include notches, protrusions, conductive foils, conductive material deposited on the turbine shroud, shallow slots formed in the turbine shroud which are filled with a conductive material, and notches cut in the leading and/or trailing edges of the shroud segment.

However, it has been found that the use of these targets entails significant costs and, in some applications, may actually decrease the long term performance capabilities of the turbine shroud. In order to provide a notch target or, in the alternative, to deposit a highly conductive material directly onto the shroud, sophisticated equipment must be brought to the turbine site and must be capable of being operable within the confines of the turbine machinery. One of ordinary skill in the art would recognize the significant costs associated with the use of these targets. One of ordinary skill would also recognize that a notch in the shroud segment may cause concentrated stress at that location and may be a cite for crack initiation within the shroud.

Therefore there is a need for a target for use in a shrouded blade monitoring system which will efficiently provide data associated with turbine blade vibrations, yet may be installed onto and removed from the shroud segment of the turbine blades at a low cost.

Accordingly it is an object of the present invention to provide a shrouded turbine blade monitoring target comprising a shim which is plated with a highly conductive material and which may be spot welded to the shroud segment of shrouded turbine blades in order to provide a signal which is adapted for monitoring turbine blade vibration.

SUMMARY OF THE INVENTION

The present invention is directed to a target for use in a system for monitoring the vibrations of shrouded turbine blades. The target causes variations in eddy currents induced by a sensor, and such variations are converted into data used for determining the vibrations of the turbine blades. The target of the present invention comprises a shim, one surface of which is plated with a highly conductive material. The non-plated surface of the shim is spot welded, using low voltage resistance welding techniques, to the shroud segment of the turbine blades. The highly conductive material of the target causes the necessary variations in the eddy currents generated by a stationary sensor. As a result, data representative of the time of arrival of a particular shrouded blade segment at a specified location may be gathered and used to determine blade vibrations. These and other advantages and benefits of the present invention will become apparent form the description of the preferred embodiments provided below.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENTS

Figure 1:
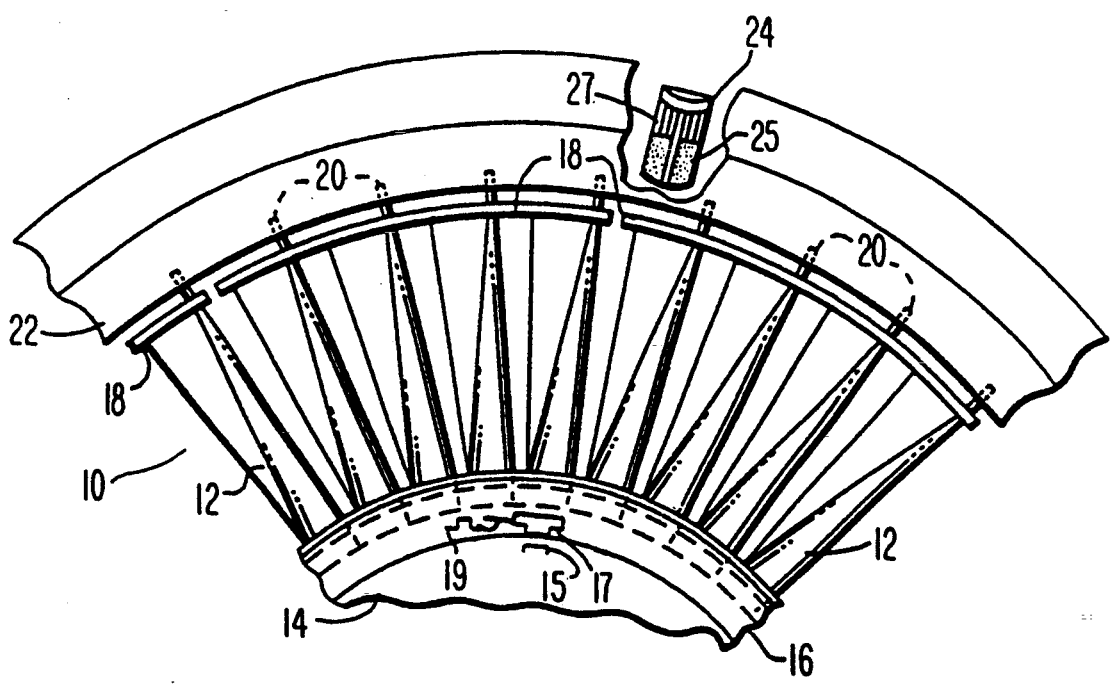
FIG. 1 illustrates a portion of a typical shrouded turbine blade row having a stationary sensor.

FIG. 1 illustrates a portion of a shrouded turbine blade row 10 in which the apparatus of the present invention to monitor turbine blade vibration can be employed. Like reference numerals are employed among the various figures to designate like elements. In FIG. 1, the turbine blades 12 are connected to a rotor 14 by means of a rotor disk 16. The rotor 14 carries indicia 15 which cooperates with the sensor 17 to produce a pulse 19 once per rotor 14 revolution. The sensor 17 is mounted on a stationary bracket in the vicinity of the pedestal area of the turbine. The production of such a once per revolution pulse 19 is well known in the art.

Tenons 20 are integral parts of the blades 12 and serve to fasten the shroud segments 18 to the blades 12. Two complete shroud segments 18 are shown, and one segment is partially shown in FIG. 1. As is known, the shroud segments, taken collectively, form the turbine blade shroud. A seal 22 is located on the base of the stationary cylinder, slightly forward of the turbine blade row 10. The seal 22 reduces the amount of steam that passes around, instead of through, the turbine blades 12.

Also illustrated in FIG. 1 is a sensor 24 located within seal 22. The sensor is situated in the plane of the blade row 10, outside of the direct flow path of the steam through the turbine blades 12, thus preventing damage to the sensor 24. The sensor may be one of the commercially available eddy-current type sensors commonly in use today. As is known, such sensors have an AC excited excitation coil 25 for inducing eddy currents in conductive materials brought into close proximity to the sensor 24. The induced eddy currents create a magnetic field which causes the inductance and resistance of the excitation coil 25 to change. A sensing coil 27 is responsive to such changes to produce an output signal, which is representative of the time of arrival of the turbine blades 12 at a specified point. This output signal may be read, along with the once per revolution pulse 19, by a blade vibration monitor and can be used to determine the vibrations of the shrouded turbine blades.

Figure 2:
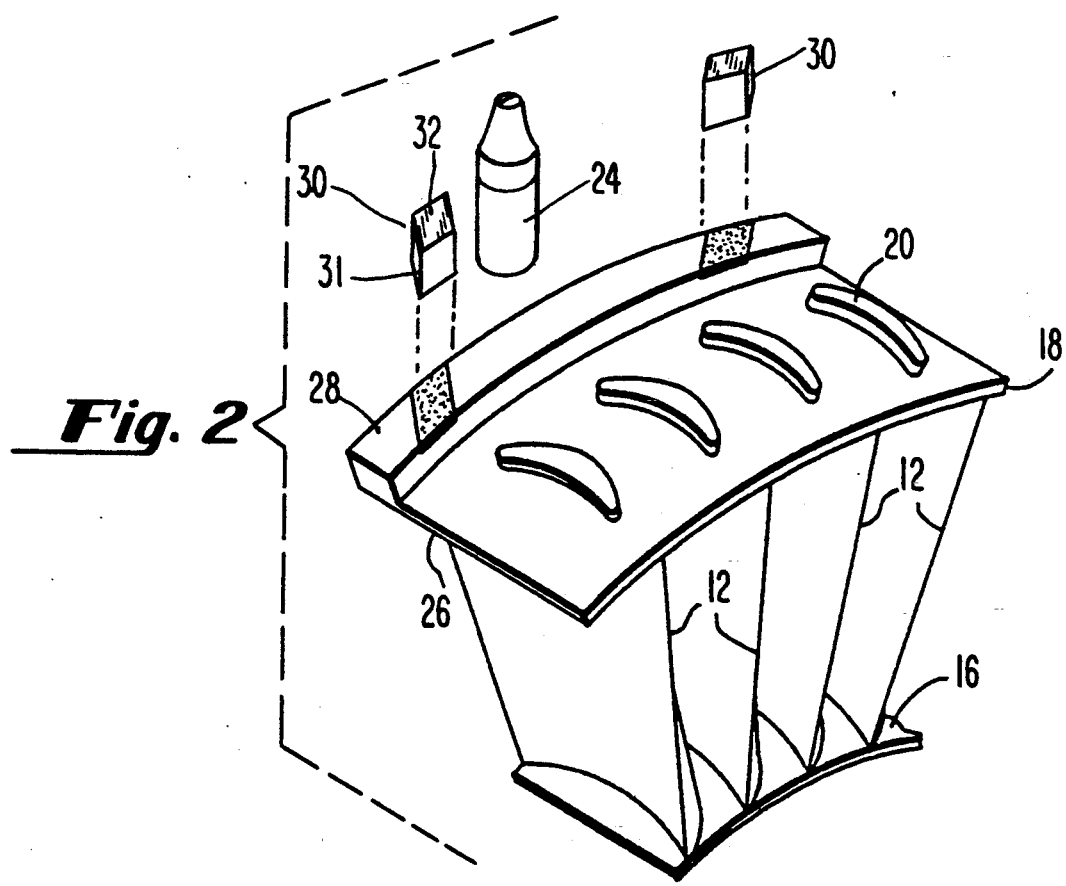
FIG. 2 illustrates one of the shroud segments shown in FIG. 1 having targets located on the shroud segment in accordance with the teachings of the present invention.

A single shroud segment 18 and the corresponding section of the turbine blades 12 is shown in FIG. 2. The shroud segment 18 has a first portion 26, to which the tenons 20 are connected, and a second raised lip portion 28. The sensor 24 is shown located near the shroud segment, and particularly near the second raised lip portion 28, as it would be located within the seal, which is not shown.

As illustrated in FIG. 2, a target 30 is provided on the second raised lip portion 28 of the shroud segment 18. The target 30 comprises a shim 31 which is plated with a highly conductive material 32. The dimensions of the target, as shown, are grossly exaggerated for illustration purposes. In a preferred embodiment of the present invention, the shim 31 is made from a strip of Nichrome 60 which may be 0.0889 millimeters thick, and preferably in the range of 0.08 to 0.1 mm. One of ordinary skill in the art would recognize that the width and length of the shim 31 are dependant upon the particular shroud which is to be monitored, and more particularly, the dimensions of the second raised lip portion 28. In an embodiment of the present invention, the highly conductive material 32 which is plated onto the shim 31 is silver. In another embodiment of the present invention, the highly conductive material 32 is copper. The conductive target 30 provides a step change in the output of the sensor 24 which would not occur in the absence of the target 30. That step change variation indicates that the target 30 is at the sensor 24 and this information is read by a blade vibration monitor to determine turbine blade vibration.

The target 30 may be welded to the second raised lip portion 28 at the turbine site. Portable spot-welding equipment may be easily brought to the turbine site and is easily operable within the confines of the turbine machinery for welding the target to the second raised lip portion 28 of the shroud segment 18. The spot welding process to be employed in accordance with the present invention is a low energy resistance type of welding process which is commonly known in the art. The low energy resistance spot welding process will have a minimal effect on the shim 31 and the highly conductive material 32.

In order to attach the target 30 on the second raised lip portion 28 of the shroud segment 18, the non-plated surface of the shim 31 should be abraded. The non-plated surface of the shim 31 may be abraded by hand using 320 grit emery paper. Both surfaces of the target 30 should be cleaned using a solvent, such as Methyl Ethyl Ketone. The area of the second raised lip portion 28 where the target is to be provided should first be abraded. Abrading of the second raised lip portion 28 may be done using 180 to 240 grit emery wheels or discs. This area of the shroud should then be cleaned using a solvent, such as Methyl Ethyl Keytone. The non-plated surface of the shim 31 may then be spot welded to the second raised lip portion 28, in accordance with the welding techniques discussed above. One of ordinary skill would recognize the ease with which the target 30 may be installed onto the shroud segment 18 and the resulting cost savings when compared with installation techniques for other types of targets, such as notches. Also, should removal of the target become necessary after monitoring is complete, so as to restore the shroud to its original condition, the target 30 may be simply removed with a sharp chisel and the weld spots may be blended out using a fine emery paper, as is commonly known.

As illustrated in FIG. 2, when the target 30 is oriented at an angle with respect to the axis of the rotor 14, the arrival time at the sensor 24 is effected by axial as well as tangential deflections of the blades. Therefore, the target of the present invention can be used in a blade vibration monitoring system to detect axial as well as tangential blade vibration. Also, if more than one target is placed on the shroud segment 18, as shown in FIG. 2, multiple measurements may be made on a single group of turbine blades 12 in the shroud segment 18. These multiple measurements allow for discrimination among the mode shapes of the blades and a more accurate calculation of the blade vibrations.

While the present invention has been described in connection with exemplary embodiments thereof, it will be understood that many modifications and variations will be readily apparent to those of ordinary skill in the art. This disclosure and the following claims are intended to cover all such modifications and variations.

What is claimed:

1. In a steam turbine system comprising a rotor carrying a plurality of turbine blades and having a plurality of shroud segments connected to predetermined groups of said blades, a method for attaching at least one monitoring target on each of said shroud segments, wherein each said target comprises a shim plated on one surface with a highly conductive material, said method comprising the following steps for each said target:
   abrading the non-plated surface of said shim;
   solvent cleaning both the non-plated surface of said shim and the surface with a highly conductive material;
   abrading the shroud segment surface for receiving said target;
   solvent cleaning the shroud segment surface for receiving said target; and
   spot welding the non-plated surface of said shim to the shroud segment surface for receiving said target,
whereby each said target is capable of interacting with a sensor for creating a signal to be read in a system for determining turbine blade vibration.

2. The method as described in claim 1, wherein said shim is a thin metallic strip comprised of nichrome 60.

3. The method as described in claim 1, wherein said highly conductive material is one of the group of silver and copper.

4. The method as described in claim 1, wherein each said shroud segment comprises a raised lip portion, wherein said target is attached to said raised lip portion.

5. The method as described in claim 1, wherein each said target on said raised lip portion is oriented at an angle with respect to the axis of said rotor.

6. In a steam turbine system comprising a rotor, rotatable about a rotor axis, said rotor carrying a plurality of turbine blades and having a plurality of shroud segments connected to predetermined groups of said turbine blades, a method for attaching a monitoring target upon at least one of said plurality of shroud segments, wherein said monitoring target comprises a shim having a surface plates with a highly conductive material, said method comprising:

positioning said monitoring target upon said at least one of said plurality of shroud segments in an orientation such that said surface plated with said highly conductive material is capable of interacting with a sensor for creating a signal to be read in a system for determining blade vibration; and attaching said monitoring target to said at least one of said plurality of shroud segments in said orientation.

7. The method as described in claim 6, wherein said shim comprises a thin metallic strip of nichrome 60.

8. The method as described in claim 6, wherein said highly conductive material is selected from the group consisting of silver and copper.

9. The method as described in claim 6, wherein said at least one of said plurality of shroud segments comprises a raised lip portion and wherein said monitoring target is attached to said raised lip portion.

10. The method as described in claim 9, wherein said orientation comprises said target being attached at an angle with respect to said rotor axis.

11. In a steam turbine system comprising a rotor rotatable about a rotor axis and carrying a plurality of turbine blades including a plurality of shroud segments connected to predetermined groups of said turbine blades, a method for attaching a monitoring target upon at least one of said plurality of shroud segments, wherein said monitoring target comprises a shim having a surface plated with a highly conductive material and said highly conductive material is selected from the group consisting of silver and copper, said method comprising:

positioning said monitoring target upon said at least one of said plurality of shroud segments at an angle with respect to said rotor axis such that said surface plated with said highly conductive material is capable of interacting with a sensor for creating a signal to be read in a system for determining blade vibration; and attaching said monitoring target to said at least one of said plurality of shroud segments in said orientation.

* * * * *